United States Patent
Choi et al.

(10) Patent No.: US 7,526,300 B2
(45) Date of Patent: Apr. 28, 2009

(54) SHORT MESSAGE MANAGEMENT SYSTEM USING A VM APPLICATION AND A MOBILE COMMUNICATION TERMINAL

(75) Inventors: Ho-Sung Choi, Seoul (KR); Sung-Bin Im, Seoul (KR); In-Ho Shin, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 397 days.

(21) Appl. No.: 11/374,320

(22) Filed: Mar. 13, 2006

(65) Prior Publication Data

US 2006/0212529 A1  Sep. 21, 2006

(30) Foreign Application Priority Data

Mar. 16, 2005  (KR) .................. 10-2005-0021847

(51) Int. Cl.
*G06F 15/16* (2006.01)
(52) U.S. Cl. .............. 455/466; 455/414.1; 709/206
(58) Field of Classification Search .......... 455/416, 455/414.1, 422.1, 466; 379/204.01; 709/206
See application file for complete search history.

(56) References Cited

U.S. PATENT DOCUMENTS

2004/0125933 A1* 7/2004 Jun et al. ............... 379/202.01

\* cited by examiner

*Primary Examiner*—Sam Bhattacharya
(74) *Attorney, Agent, or Firm*—Lowe Hauptman Ham & Berner, LLP

(57) ABSTRACT

A message management service server includes a messaging group information storage unit for storing messaging group information, a VM environment setting information storage unit for storing user-set environment information, a group special service code management unit for managing group special service code information, a group message history storage unit for storing messages transmitted or received between users of each messaging group, a VM application creation unit for creating the VM application, a VM application download unit for downloading the created VM application to the mobile communication terminal of the user, a SMS message transmission unit for transmitting a short message to the mobile communication terminals of the users of a messaging group of a specific special service code, and a message posting unit for storing transmitted or received messages via the group history storage unit and posting the messages according to a message posting environment of a corresponding group.

7 Claims, 4 Drawing Sheets

FIG. 1

Short messages between friends/persons in love

John♡Jane

▲ Together
☐ John:I am hungry,babe.
☐ Jane:Me,too.
☐ John:What do you want to eat?
☐ Jane:Pizza.
☐ John:It will be delicious.
☐ Jane:I will order it.

1.2.3.4......

[Previous] [Select]
[Menu] [Next]

Blog

John's Blog

☐ 2005.1.4 10:28 Sleepy
  ↳2005.1.4 12:11 Go to bed!
☐ 2005.1.4 12:20 I don't want to sleep...
☐ 2005.1.4 12:23 Sleepy also
☐ 2005.1.4 12:25 Continuously sleepy
☐ 2005.1.4 12:36 Languor after meal!

1.2.3.4......

[Previous] [Select]
[Menu] [Next]

Message board for association of like-minded persons

People for best restaurants

▲ Official announcement
☐ Captain: Notice for tomorrow's meeting...(New)(2)
☐ Beauty: Congratulations!
☐ Beauty: Notice for new members 1.2.3.4......

[Previous] [Next]

▲ Free message board
☐ Captain: Everybody, present?
☐ Best cook: Recipe for steamed buns
☐ Best cook: Recipe for chopped noodles 1.2.3.4......

[Previous] [Next]
[Menu]

1.register
2.reply
3.delete
4.recommend
5.oppose

SHORT MESSAGE MANAGEMENT SYSTEM USING A VM APPLICATION AND A MOBILE COMMUNICATION TERMINAL

BACKGROUND OF THE INVENTION

1. Field of the Invention

The present invention relates generally to a short message management system using a virtual machine application and a mobile communication terminal, and, more particularly, to a short message management system using a virtual machine application and a mobile communication terminal, in which the virtual machine application for managing short message service messages is provided in the mobile communication terminal, so that various types of short message services can be provided.

2. Description of the Related Art

Existing Short Message Service (SMS) is disadvantageous in that short messages are uniformly stored in the short message storage box of a mobile communication terminal and no additional functions for managing short messages are provided.

Furthermore, the short message storage box of a mobile communication terminal has limited capacity, so that storing a large number of short messages is only possible by transmitting and storing short messages to a Personal Computer (PC) through a cable.

Accordingly, the efficient management of short messages as well as the storage of short messages is not currently performed at all.

SUMMARY OF THE INVENTION

Accordingly, the present invention has been made keeping in mind the above problems occurring in the prior art, and an object of the present invention is to provide a short message management system using a Virtual Machine (VM) application and a mobile communication terminal, which allow each user to set up his or her own VM application environment for the management of short messages and provide various services, including a message management service, to the user through the installation of the VM application in the mobile communication terminal.

In order to accomplish the above object, the present invention provides a short message management system using a VM application, the system including a message management service server providing the VM application for managing short messages for a user of each mobile communication terminal and providing a short message management service via the VM application installed in the mobile communication terminal, wherein the message management service server includes a messaging group information storage unit for storing messaging group information, including group names set by the user for respective messaging groups used to classify and manage short messages, the mobile communication terminal numbers of users belonging to each of the messaging groups, and a nickname of the user; a VM environment setting information storage unit for storing user-set environment information, including a type and an environment for posting messages transmitted or received between users of each messaging group; a group special service code management unit for managing group special service code information used at a time of transmitting or receiving messages so as to manage the messages for the respective messaging groups; a group message history storage unit for storing messages transmitted or received between users of each messaging group according to the message posting type and environment for the corresponding messaging group; a VM application creation unit for creating the VM application, including one or more storage boxes for each messaging group, according to the messaging group information and the VM environment information set for the user; a VM application download unit for downloading the created VM application to the mobile communication terminal of the user; a SMS message transmission unit for transmitting a short message to the mobile communication terminals of users that belong to a messaging group of a specific special service code when receiving the short message, a receiving number of which includes the specific special service code of the messaging group, from a user who has downloaded the VM application; and a message posting unit for storing transmitted or received messages via the group history storage unit and posting the messages according to a message posting environment of a corresponding group, so that a message transmission and reception history can be searched for over the Internet.

In addition, the present invention provides a mobile communication terminal in which a VM application module for allowing short messages to be managed for respective messaging groups via a message management service server is installed, wherein the VM application module includes a messaging group information storage unit for storing messaging group information including group names of the messaging groups used to classify and manage messages, mobile communication terminal numbers of users belonging to each messaging group, and a nickname of a user, which are set by the user via the message management service server; a group message storage unit having specific types and environments for posting messages for respective messaging groups; a SMS message transmission unit for transmitting a short message with a special service code of a corresponding messaging group included in a receiving number when the user requests transmission of the short message to a user of the specific messaging group; and a SMS posting unit for storing and posting a transmitted or received message, including a special service code of a specific messaging group, in a message storage unit of the corresponding messaging group according to a message posting type and environment for the corresponding messaging group.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic diagram illustrating the present invention;

DESCRIPTION OF THE PREFERRED EMBODIMENTS

Figure 2:
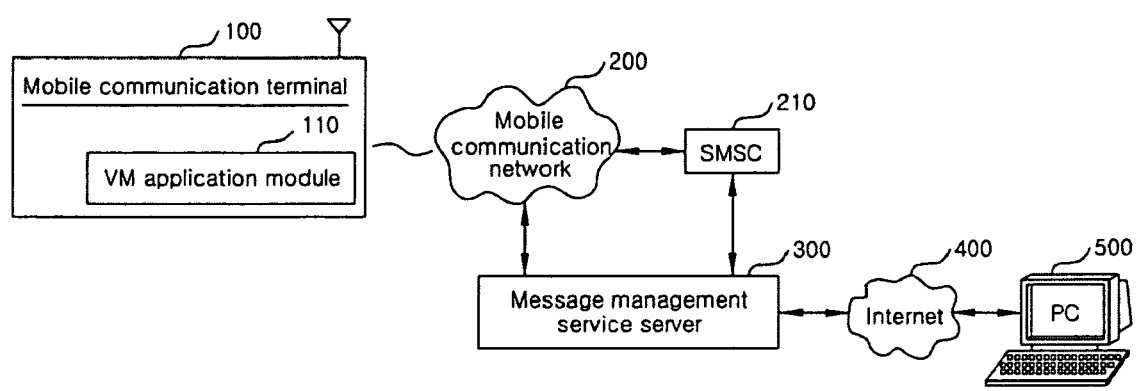
FIG. 2 is a network configuration diagram illustrating a short message management system according to the present invention.

Reference should now be made to the drawings, in which the same reference numerals are used throughout the different drawings to designate the same or similar components.

FIG. 1 is a schematic diagram illustrating the present invention, which illustrates the types for posting messages for respective messaging groups in a mobile communication terminal.

In the present invention, a VM application for managing messages for respective messaging groups is installed in a mobile communication terminal, and short messages transmitted and received between the users of each messaging group are separately managed through the VM application, as illustrated in FIG. 1.

That is, the VM application installed in the mobile communication terminal is provided with storage boxes for storing messages for the respective messaging groups, and posts messages in various forms according to the environment set by the user. The messages may be posted using various types, such as a bulletin board or a blog, as illustrated in FIG. 1, depending on the user's preferences.

The components of the present invention for managing messages via a VM application, as illustrated in FIG. 1, are described with reference to FIGS. 2 to 4.

FIG. 2 is a network configuration diagram illustrating the short message management system of the present invention.

As illustrated in FIG. 2, the mobile communication terminal 100 is provided with a VM application module 110 for managing messages, and a mobile communication network 200 and a short message service center (SMSC) 210 for providing short messages via the mobile communication network 200 are connected to the message management service server 300 of the present invention.

Furthermore, the message management service server 300 is connected to the Internet 400 and provides an application creation environment so that a user can construct his or her own VM applications and search for a message history using a PC 500 via the Internet 400.

Accordingly, the user accesses the message management service server 300 over the Internet 400, sets up groups to manage and store messages for the respective groups, and sets the group names of the respective groups, the types of methods for posting messages in message storage boxes for the respective groups, the mobile communication terminal numbers of users that belong to the respective groups, and his or her nickname to be used within the groups.

The message management service server 300 creates the VM application modules 110 of corresponding users while reflecting the above-described setting information, and downloads the VM application modules 110 to the user's mobile communication terminal 100 and the mobile communication terminal 100 of another user invited by the user. The mobile communication terminals 100 are equipped with the downloaded VM application modules 110, so that the transmission and management of messages can be performed for the respective groups.

Meanwhile, in an embodiment for the transmission and reception of messages for respective groups, the message management service server 300 assigns the respective groups special service codes, and stores the special service codes, along with group information.

Furthermore, when the user selects a user from a corresponding group and attempts to transmit a message via the message storage box of the group, the VM application module 110 transmits the message with the special service code of the messaging group included in the receiving number of the message, and the short message service center (SMSC) 210 transmits the message to the message management service server 300.

The message management service server 300 recognizes the special service code included in the receiving number, transmits the message to the user of the corresponding group, and stores and posts the message in the message history of the corresponding group, so that the user can search for the message history.

Furthermore, a received message including a special service code, or a message received through the message management service server 300, is managed by the VM application module 110 of the mobile communication terminal 100 that receives the message. The VM application module 110 stores and posts a received message in the corresponding storage box of a message storage unit for the groups.

The VM application module for the management of messages for respective groups is described below in more detail.

Figure 3:
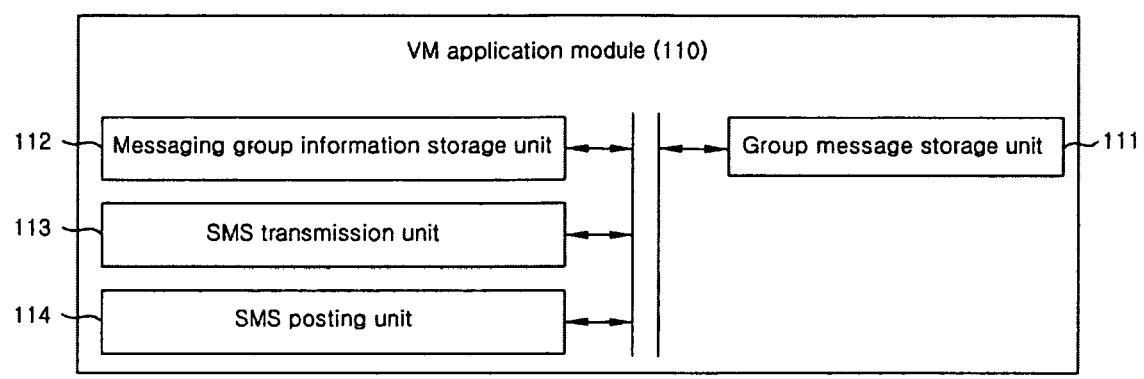
FIG. 3 is a diagram illustrating the configuration of a VM application module installed in the mobile communication terminal of FIG. 2.

FIG. 3 is a block diagram illustrating the construction of the VM application module 110 installed in the mobile communication terminal of FIG. 2. As illustrated in this drawing, the VM application module 110 includes one or more message storage units 111, a messaging group information storage unit 112, a SMS message transmission unit 113, and a SMS posting unit 114.

The VM application module 110 is created, downloaded, and installed in a mobile communication terminal by the message management service server 300. The VM application module 110 has a group message storage unit 111 according to information set by the user in the message management service server 300. The group message storage units 111, as illustrated in FIG. 1, are implemented under an environment based on a group name, a user's nickname, and the posting type for transmitted and received messages, which have been set by the user.

The messaging group information storage unit 112 must store messaging group information, including the group names of messaging groups used to classify and manage messages, the mobile communication terminal numbers of users belonging to each messaging group, and a nickname, which are set by a user via the message management service server 300.

When the user requests the transmission of a short message to the user of a specific messaging group, the SMS message transmission unit 113 includes the special service code of a corresponding messaging group in a receiving number using the information of the messaging group information storage unit 112, and transmits the message to the receiving number.

Meanwhile, a short message can be transmitted through the VM application module 110, or can be transmitted in such a way that the user directly inputs a special service code. When the user selects a user from one of the members in a specific group stored in the VM application module 110 and transmits a message, or selects one of the posted messages and transmits a message using a "Reply to Author" function or the like, the VM application module 110 transmits the message while including a special service code for a corresponding group in the message. The user may also transmit a message to a user of a corresponding group by directly inputting a special service code without using the VM application.

The SMS posting unit 114 stores and posts each transmitted or received message, including the special service code of a specific messaging group, in the message storage unit 111 of the corresponding messaging group according to the message posting type and environment for the corresponding group.

Figure 4:
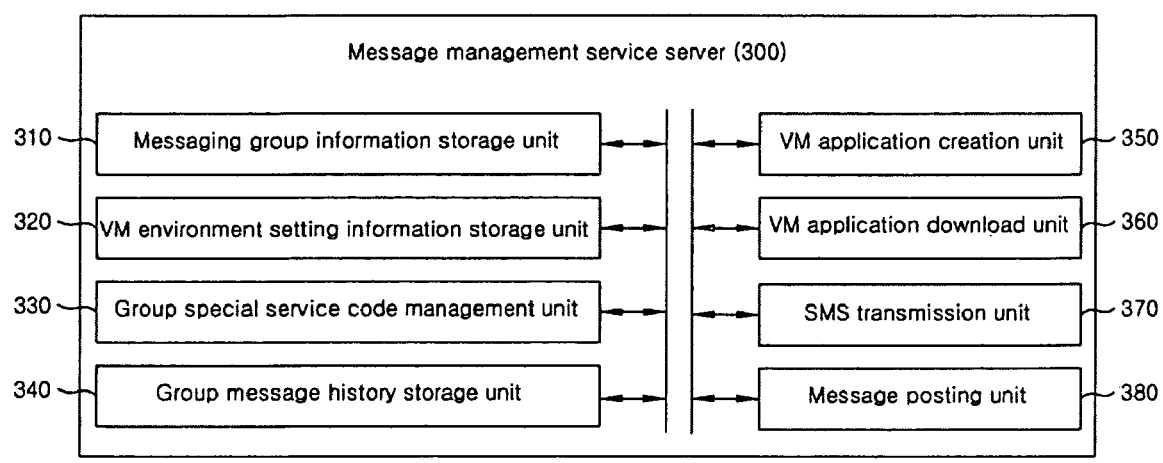
FIG. 4 is a diagram illustrating the construction of the message management service server of FIG. 2.

FIG. 4 is a diagram illustrating the construction of the message management service server of FIG. 2.

As illustrated in the drawing, the message management service server 300 includes a messaging group information storage unit 310, a VM environment setting information storage unit 320, a group special service code management unit 330, a group message history storage unit 340, a VM application creation unit 350, a VM application download unit 360, a SMS message transmission unit 370, and a message posting unit 380.

The messaging group information storage unit 310 stores messaging group information, including group names set by the user for respective groups for which messages are classified and managed, the mobile communication terminal numbers of the users of each group, and a user's nickname.

The VM environment setting information storage unit 320 stores user-set environment information, including the posting type and environment for posting messages exchanged between the users of each messaging group.

The group special service code management unit 330 assigns and manages special service code information for respective messaging groups, which is used at the time of transmitting and receiving the messages, so as to manage messages for respective messaging groups according to the user's information setting for the messaging groups.

When a message is transmitted or received using the special service code information for each group, the corresponding message is managed via the VM application module 110 and is separately stored in the message storage boxes of the mobile communication terminal 100 and the message management service server 300 for the corresponding messaging group.

The group message history storage unit 340 stores a message exchanged between the users of each messaging group according to the message posting type and environment for the corresponding messaging group.

Consequently, the group message history storage unit 340 allows the user to view a message history over the Internet 400 in the same manner as through the VM application module 11 of his or her mobile communication terminal 100.

The VM application creation unit 350 creates a VM application, including one or more message storage boxes for each messaging group, according to the messaging group information and VM environment information set for each user.

The VM application download unit 360 downloads the created VM application to the user's mobile communication terminal.

In this case, the VM application may be downloaded to the mobile communication terminals of the users of a specific messaging group, which is set by the user who creates the VM application, as well as the mobile communication terminal of the user. It is preferred that the download of the VM application to the users of a specific messaging group be performed at the request of the users that constitute the specific group.

Furthermore, the VM application must be suitable to the specifications of the mobile communication terminal. Accordingly, the VM application download unit 360 transmits a Uniform Resource Locator (URL) push message to a mobile communication terminal, and detects the specifications of the mobile communication terminal using the response, modifies a previously created application for the specifications of the mobile communication terminal and downloads the modified application when the mobile communication terminal having received the URL push message, accesses a corresponding URL.

When the SMS message transmission unit 370 receives a short message, the receiving number of which includes the special service code of a specific messaging group, from the user having received the VM application, the SMS message transmission unit 370 transmits the short message to the mobile communication terminals that belong to the messaging group of the corresponding special service code.

The message posting unit 380 stores the received or transmitted message via the group message history storage unit 340 and posts the message according to the message posting environment of the corresponding messaging group, so that a message transmission or reception history can be searched for over the Internet.

Although the present invention has been described only in conjunction with Short messages, the present invention may be applied to long messages and multimedia messages that are transmitted, received and managed through mobile communication terminals.

Accordingly, the short message management system and mobile communication terminal using a VM application according to the present invention are advantageous in that a VM application, for which the user has set his or her own environment so as to manage short messages, is installed in a mobile communication terminal so that messages can be managed to meet the user's preferences, and various services, such as a group message board, can be created using short messages.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A short message management system using a Virtual Machine (VM) application, the system comprising a message management service server providing the VM application for managing short messages for a user of each mobile communication terminal and providing a short message management service via the VM application installed in the mobile communication terminal, wherein the message management service server includes:

a messaging group information storage unit for storing messaging group information, including group names set by the user for respective messaging groups used to classify and manage short messages, the mobile communication terminal numbers of users belonging to each of the messaging groups, and a nickname of the user;

a VM environment setting information storage unit for storing user-set VM environment information, including a type and an environment for posting messages transmitted or received between users of each messaging group;

a group special service code management unit for managing group special service code information used at a time of transmitting or receiving messages so as to manage the messages for the respective messaging groups;

a group message history storage unit for storing messages transmitted or received between users of each messaging group according to the message posting type and environment for the corresponding messaging group;

a VM application creation unit for creating the VM application, including one or more storage boxes for each messaging group, according to the messaging group information and the VM environment information set for the user;

a VM application download unit for downloading the created VM application to the mobile communication terminal of the user;

a SMS message transmission unit for transmitting a short message to the mobile communication terminals of users that belong to a messaging group of a specific special service code when receiving the short message, a receiving number of which includes the specific special service code of the messaging group, from a user who has downloaded the VM application; and a message posting unit for storing transmitted or received messages via the group message history storage unit and posting the messages according to a message posting environment of a corresponding group, so that a message transmission and reception history can be searched for over the Internet.

2. The short message management system as set forth in claim 1, wherein the VM application download unit is adapted to transmit a Uniform Resource Locator (URL) push message to a mobile communication terminal of a download target user, detect specifications of the mobile communication terminal, modify a previously created VM application for the detected specifications of the mobile communication terminal, and download the modified VM application to the mobile communication terminal when the mobile communication terminal, having received the URL push message, accesses a corresponding URL.

3. A mobile communication terminal, comprising:

a VM application module for allowing short messages to be managed for respective messaging groups via a message management service server, wherein the VM application module is installed in the mobile communication terminal and includes:

a messaging group information storage unit for storing messaging group information including at least one of group names of the messaging groups used to classify and manage messages, mobile communication terminal numbers of users belonging to each messaging group, and a nickname of a user, which are set by the user via the message management service server;

a group message storage unit having multiple message boxes with different message posting types and/or environments for posting messages for respective messaging groups;

a SMS message transmission unit for transmitting a short message with a special service code that corresponds to a specific messaging group included in a receiving number when the user requests transmission of the short message to a user of the specific messaging group; and a SMS posting unit for storing and posting each transmitted or received message, including the special service code of the specific messaging group to or from which the message was transmitted or received, in a message box of the group message storage unit that corresponds to the specific messaging group according to the message posting type and/or environment for the specific messaging group, wherein messages in different message boxes of the group message storage unit are posted differently in at least one of message posting type and environment.

4. The mobile communication terminal as set forth in claim 3, wherein said message posting types include bulletin board and blog.

5. A short message management system, comprising:

a message management service server providing a Virtual Machine (VM) application for managing short messages for a user of each mobile communication terminal and providing a short message management service via the VM application installed in the mobile communication terminal, wherein the message management service server includes:

a messaging group information storage unit for storing messaging group information, including at least one of group names set by the user for respective messaging groups used to classify and manage short messages, the mobile communication terminal numbers of users belonging to each of the messaging groups, and a nickname of the user;

a VM environment setting information storage unit for storing user-set VM environment information, including at least one of a type and an environment for posting messages transmitted or received between users of each messaging group;

a group special service code management unit for managing group special service code information used at a time of transmitting or receiving messages so as to manage the messages for the respective messaging groups;

a group message history storage unit for storing messages transmitted or received between users of each messaging group according to said at least one of the message posting type and environment for the corresponding messaging group;

a VM application creation unit for creating the VM application, including one or more storage boxes for each messaging group, according to the messaging group information and the VM environment information set for the user;

a VM application download unit for downloading the created VM application to the mobile communication terminal of the user;

a SMS message transmission unit for transmitting a short message to the mobile communication terminals of users that belong to a messaging group of a specific special service code when receiving the short message, a receiving number of which includes the specific special service code of the messaging group, from a user who has downloaded the VM application; and a message posting unit for storing transmitted or received messages via the group message history storage unit and posting the messages according to a message posting environment of a corresponding group, so that a message transmission and reception history can be searched for over the Internet.

6. The short message management system as set forth in claim 5, wherein the VM application download unit is adapted to transmit a Uniform Resource Locator (URL) push message to a mobile communication terminal of a download target user, detect specifications of the mobile communication terminal, modify a previously created VM application for the detected specifications of the mobile communication terminal, and download the modified VM application to the mobile communication terminal when the mobile communication terminal, having received the URL push message, accesses a corresponding URL.

7. The short message management system as set forth in claim 5, further comprising a plurality of mobile communication terminals in each of which said VM application is installed for allowing short messages to be managed for the respective messaging groups via the message management service server, wherein said VM application includes:

a mobile communication terminal messaging group information storage unit for storing the messaging group information set by the user via the message management service server;

a mobile communication terminal group message storage unit having specific types and/or environments for posting messages for respective messaging groups;

a mobile communication terminal SMS message transmission unit for transmitting a short message with a special service code corresponding to a specific messaging group included in a receiving number when the user requests transmission of the short message to a user of the specific messaging group; and a mobile communication terminal SMS posting unit for storing and posting a transmitted or received message, including the associated special service code of the specific messaging group, in a message storage box of the mobile communication terminal message storage unit that corresponds to the specific messaging group according to a message posting type and/or environment for the specific messaging group.

* * * * *